(12) United States Patent
Haws et al.

(10) Patent No.: US 7,216,511 B2
(45) Date of Patent: May 15, 2007

(54) FURNACE APPARATUS AND METHOD FOR TEMPERING LOW EMISSIVITY GLASS

(75) Inventors: John Haws, Vancouver, WA (US); Jay Rosen, Clackamas, OR (US)

(73) Assignee: HHH Tempering Systems, Inc., Vancouver, WA (US)

( * ) Notice: Subject to any disclaimer, the term of this patent is extended or adjusted under 35 U.S.C. 154(b) by 476 days.

(21) Appl. No.: 10/703,211

(22) Filed: Nov. 5, 2003

(65) Prior Publication Data

US 2004/0093904 A1 May 20, 2004

Related U.S. Application Data

(60) Provisional application No. 60/425,886, filed on Nov. 12, 2002.

(51) Int. Cl.
*C03B 27/00* (2006.01)
(52) U.S. Cl. .............................. 65/349; 65/348; 65/273; 65/118; 65/158
(58) Field of Classification Search .................. 65/349, 65/348, 273, 118, 158
See application file for complete search history.

(56) References Cited

U.S. PATENT DOCUMENTS

| 3,326,654 | A |   | 6/1967  | Plumat |
|-----------|---|---|---------|--------|
| 3,402,038 | A |   | 9/1968  | Hordis |
| 3,488,178 | A |   | 1/1970  | Welker |
| 3,744,985 | A |   | 7/1973  | Peternel |
| 4,071,344 | A |   | 1/1978  | Blausey, Jr. |
| 4,361,428 | A |   | 11/1982 | Bartusel et al. |
| 4,505,671 | A |   | 3/1985  | McMaster |
| 4,514,208 | A |   | 4/1985  | Nitschke |
| 4,617,046 | A |   | 10/1986 | Hals |
| 4,963,091 | A |   | 10/1990 | Hoetzl et al. |
| 5,127,827 | A |   | 7/1992  | Hoetzl et al. |
| 5,147,439 | A | * | 9/1992  | Ritz ............................ 65/158 |
| 5,163,416 | A | * | 11/1992 | Schultz et al. ............ 126/92 R |
| 5,951,734 | A | * | 9/1999  | Friedel et al. ................ 65/118 |
| 6,064,040 | A |   | 5/2000  | Muller et al. |

* cited by examiner

*Primary Examiner*—Mark Halpern
(74) *Attorney, Agent, or Firm*—Marger Johnson & McCollom, P.C.

(57) ABSTRACT

A glass tempering furnace having a chamber, rollers extending laterally within a chamber to form a transport surface for the plate glass, radiant coils positioned along the bottom of the chamber underneath the rollers, a plurality of spaced nozzle assemblies arranged in lateral side-by-side fashion within the chamber above the rollers, and fans coupled to the nozzle assemblies to draw heated air from the chamber and force the heated air onto the top surface of the plate glass. Heating elements, preferably electrically heated rods, extend between each of the nozzle assemblies and are positioned within the return path of the heated air after it is flowed onto the plate glass surface. The air then rebounds from the glass plate prior to the air again being drawn up into the fan and blown back down onto the glass. Air is then again drawn from the furnace chamber and forced through ducting to a nozzle assembly.

21 Claims, 8 Drawing Sheets

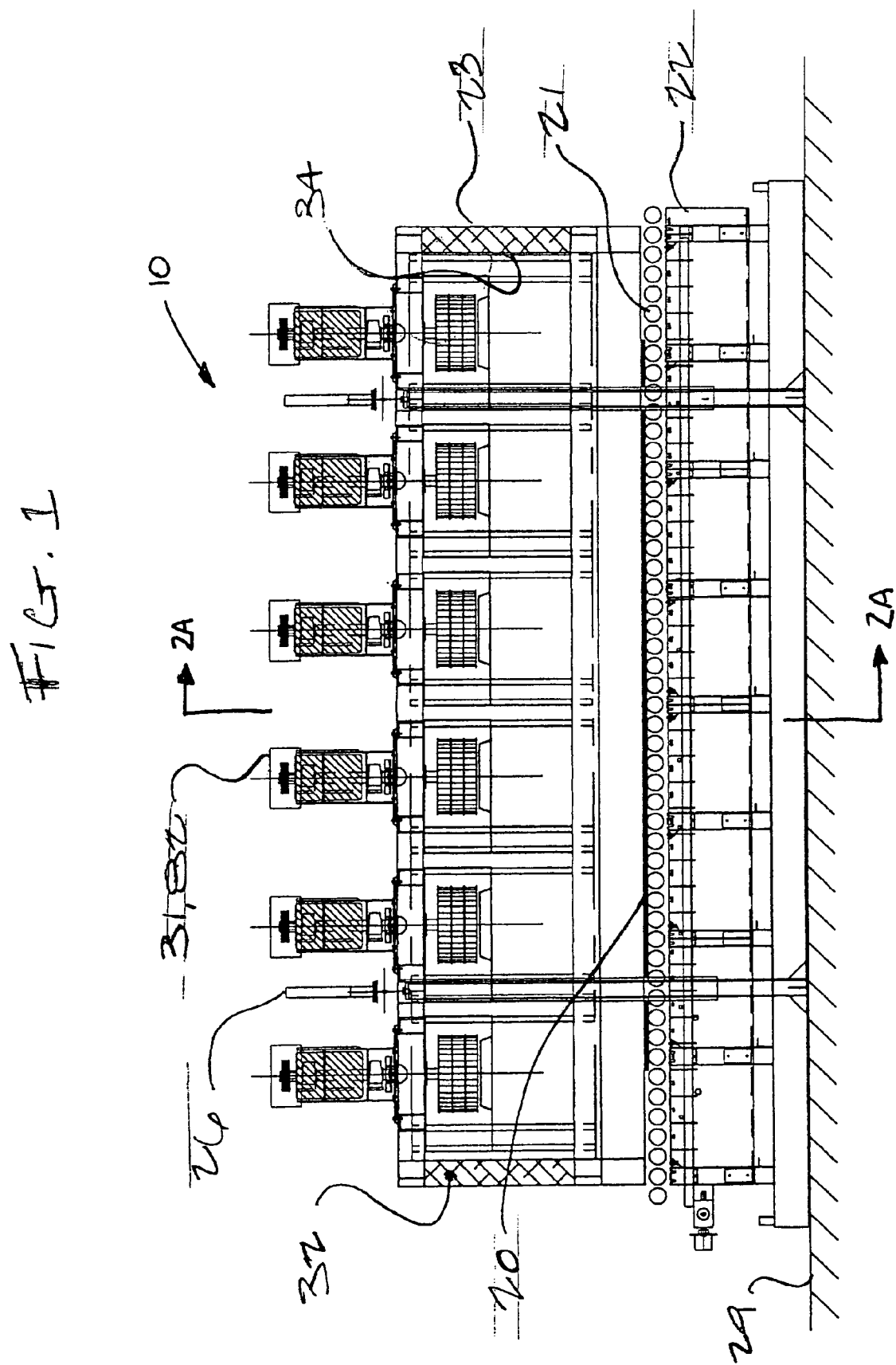

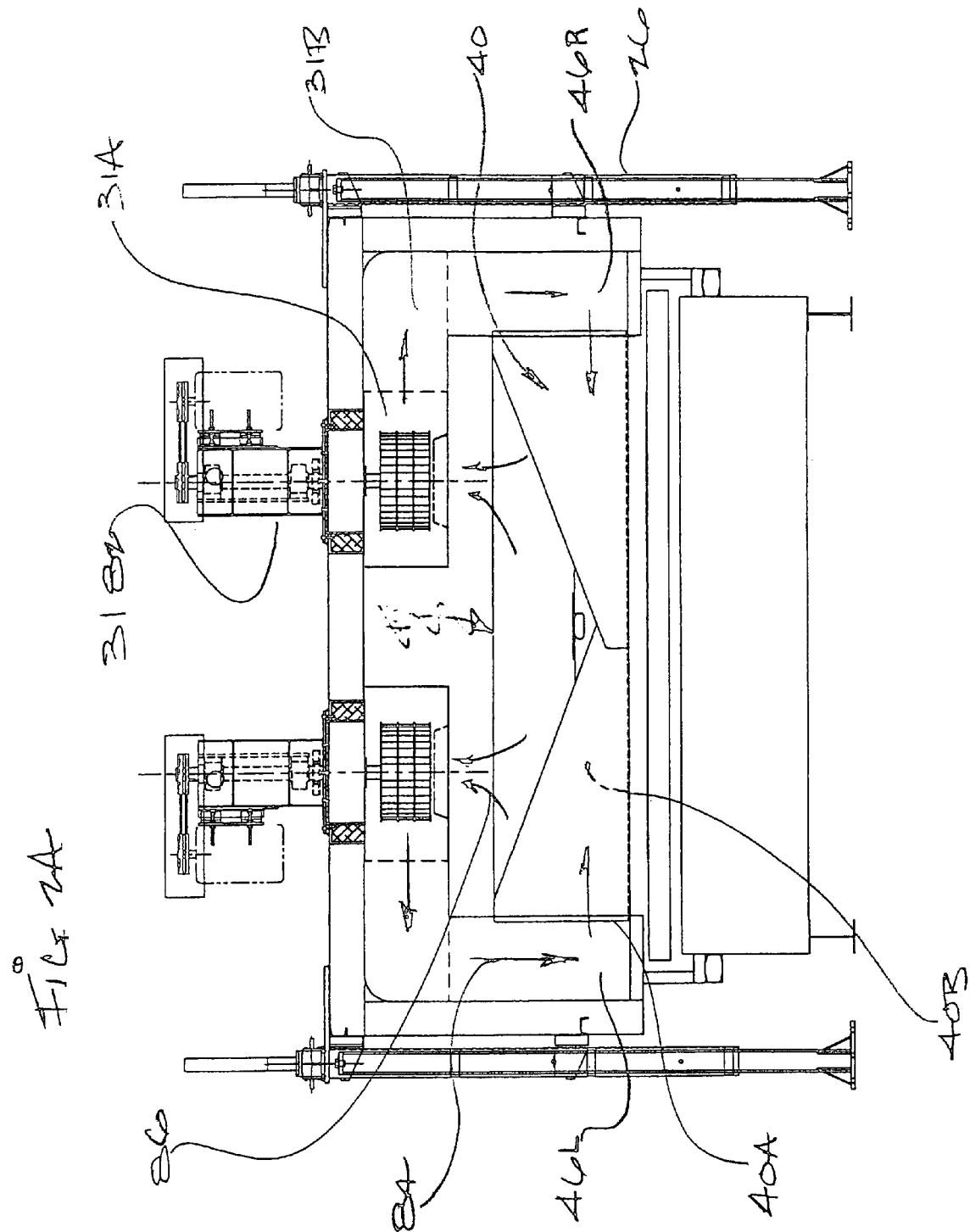

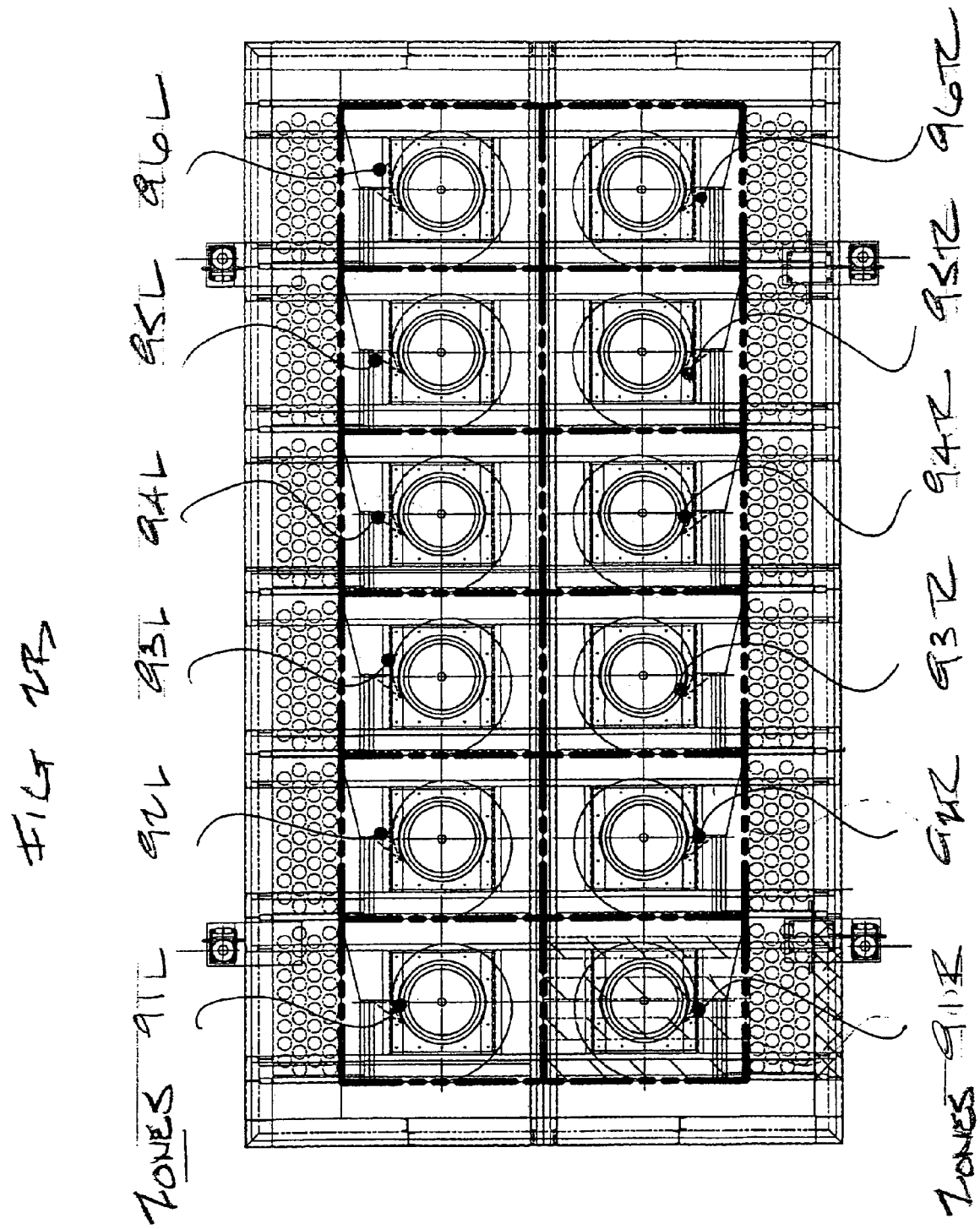

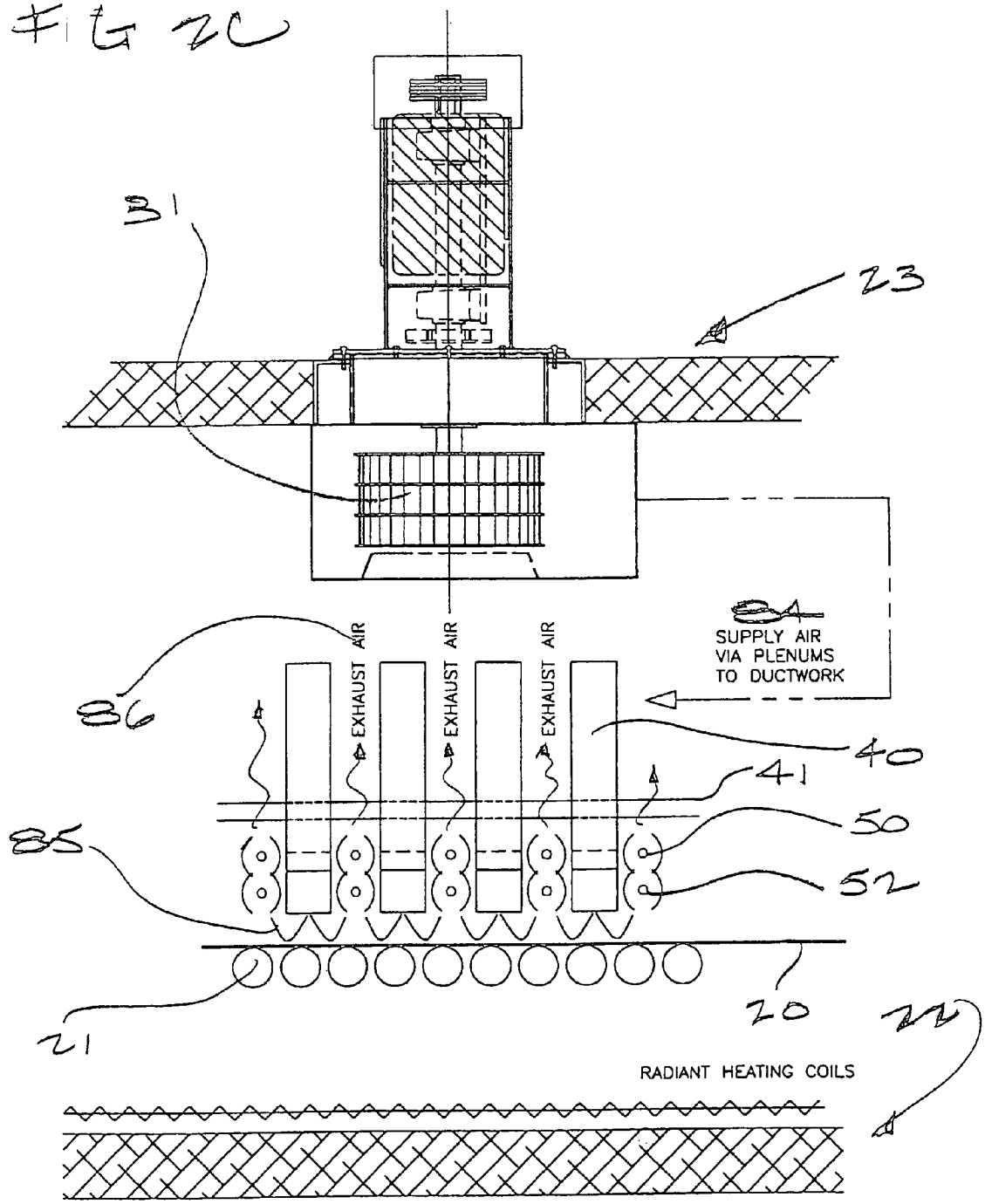

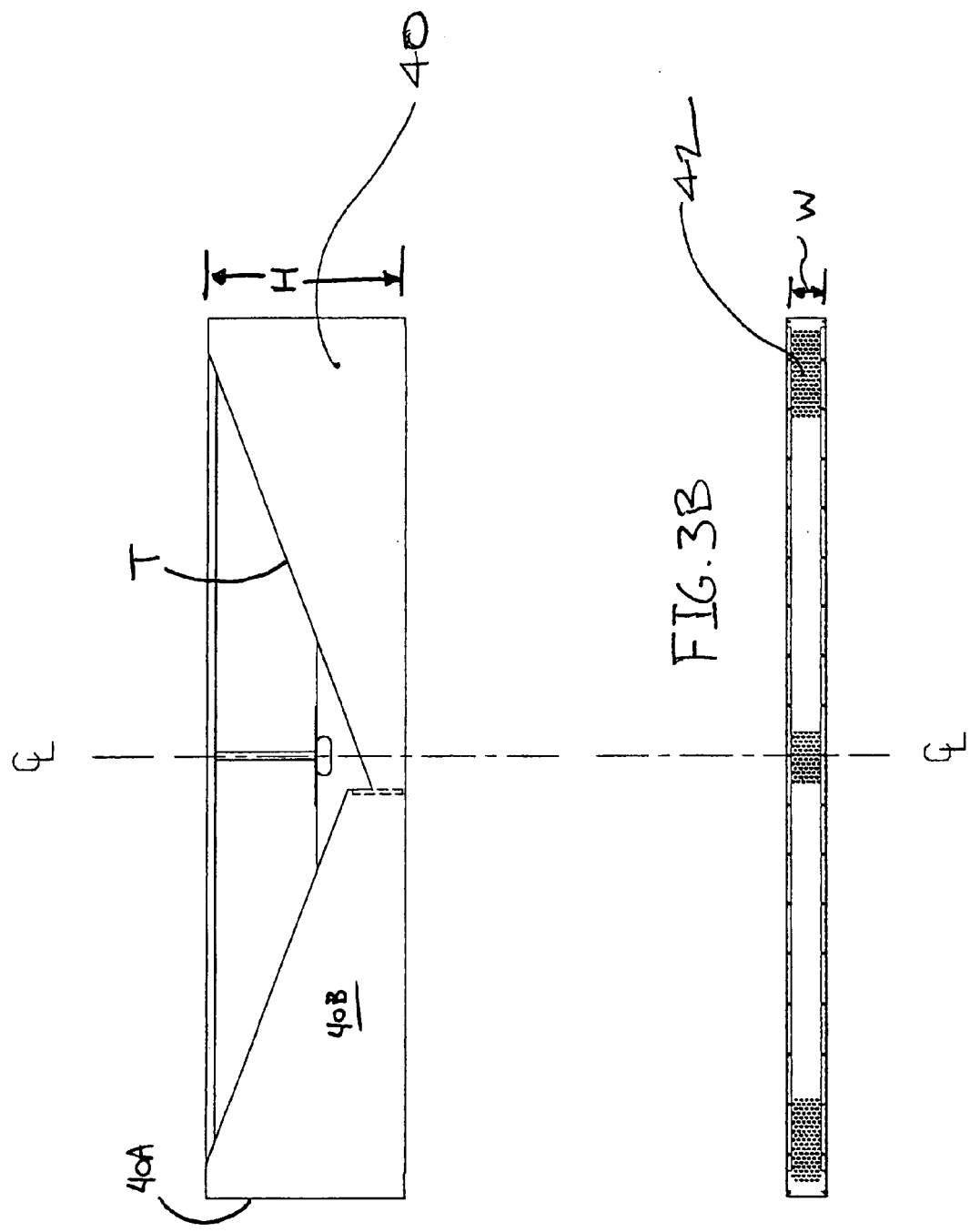

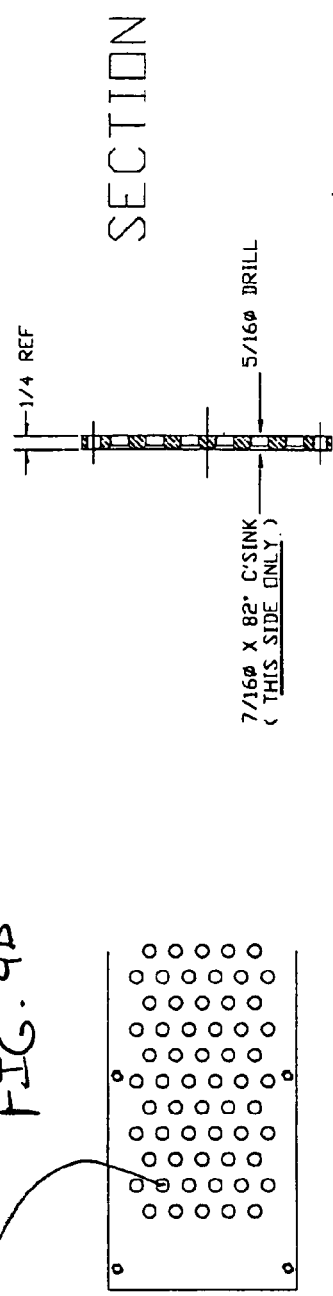
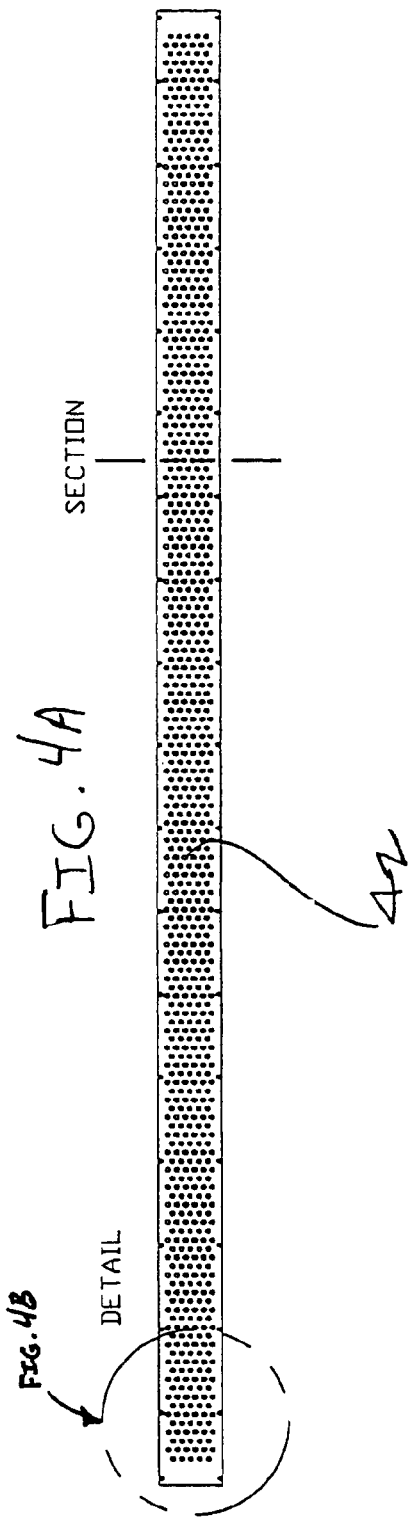

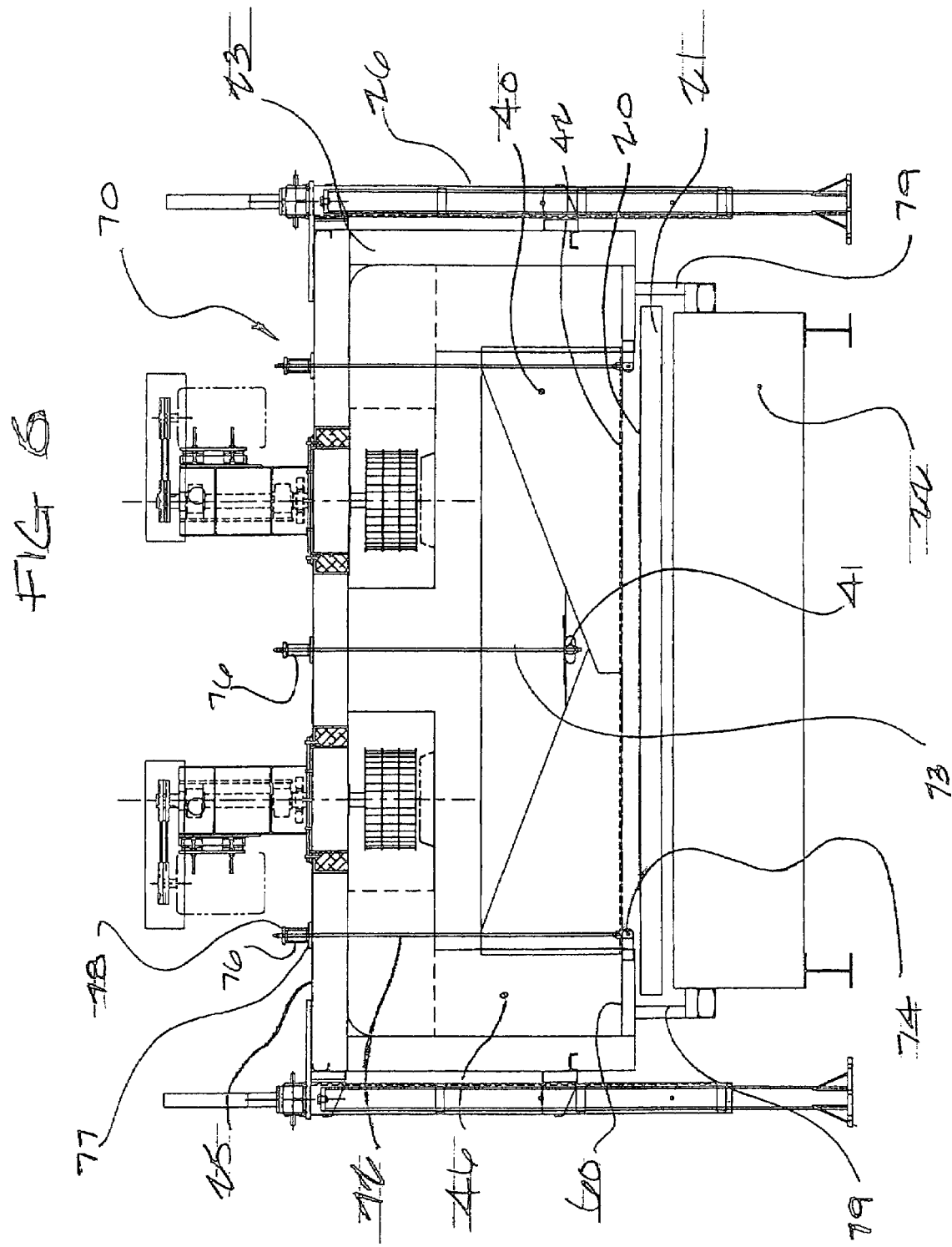

FURNACE APPARATUS AND METHOD FOR TEMPERING LOW EMISSIVITY GLASS

CROSS-REFERENCES TO RELATED APPLICATIONS

This application claims the benefit from U.S. Provisional Patent Application No. 60/425,886 filed Nov. 12, 2000 whose contents are incorporated herein for all purposes.

BACKGROUND OF THE INVENTION

1. Field of the Invention

This invention relates to furnaces for heating glass sheets and more particularly to a system and method for preventing the arching of sheet glass, and particularly glass sheets having a low emissivity coating, in a horizontal tempering conductive heat furnace.

2. Description of the Prior Art

It is known that patents exist whereby plate glass, as it passes along rollers within a furnace, can be heating using radiative (e.g. heated coils operating on the same principal as a toaster), conductive (e.g. contact with a heated surface such as rollers), or convective (e.g. hot air blown on the glass). Examples of furnaces using these various heating mechanisms are shown in U.S. Pat. No. 4,505,671 (McMaster). Other known patents are U.S. Pat. No. 3,326,654 to Plumat, U.S. Pat. No. 3,488,178 to Welker and U.S. Pat. No. 3,402,038 to Hordis. These patents appear to only disclose convective heating whereby air heated within the confines of the furnace is circulated over the glass via compressed air nozzles.

Annealed glass sheets are processed to tempering grades in furnaces utilizing radiation heat transfer as the primary energy source. Typically heating coils comprised of serpentine or helical nichrome wire are arranged in a spatial relationship with the glass surfaces such that the sheet is uniformly heated to high temperatures approaching 615° C. (1139° F.) and then air quenched in subsequent processing.

Manufacturers of glass tempering furnaces have favored radiative designs. These designs are field proven with a minimum of internal components and complexity, and process glass to uniform material and optical qualities. Standard float glass exhibits emissivity values of 0.85 and higher, leading to production times and material qualities in radiative furnaces acceptable to processing plants.

Architectural styles and building codes have changed, however, thus introducing increasing surface areas suitable for tempered glass such as doors, windows, and exterior glazing in both residential and commercial structures. Glass manufacturers are sensitive to the increasing energy requirements of the building industry. One priority is to reduce the solar load transmitted through this glass exterior. To minimize the solar influx, the exterior exposed face of the glass has been modified by application of sputtered reflecting films, etchings, or surface treatments such that the solar infrared radiation incident on the surface is highly reflected and the visible light spectrum transmitted. The interior glass face, not requiring specialty treatments, retains the emissivity and heating characteristics of typical annealed glass. Glass treated in this manner is marketed as low-E, or low-emissivity glass. Emissivities are generally stated as 0.15 and lower, with special treatments capable of producing emissivity values as low as 0.04. Though usage of this energy efficient glass is popular for the discussed energy reasons, conventional tempering using radiation heating means is quite difficult.

In a standard radiant furnace, when the high-performance Low-E glass in conveyed into the furnace, the bottom skin of the glass, which does not have the coating, receives its heat at the normal rate from the conduction of the ceramic rolls. The top skin however reflects most of the radiant energy being produced by the heating elements and does not absorb much heat. This causes the bottom skin to expand much more than the top skin and causes the glass to bow or dish up, inside the furnace. This phenomenon occurs on normal uncoated glass also but it is a very short-lived condition. In other words the top will absorb heat at a rate that will allow the skin temperatures to equalize. When this bowing occurs, there are several problems that are caused. One of the problems is related to high heat transfer from the ceramic rolls to the bottom surface of the glass due to the weight of the glass being concentrated in a smaller contact area. One of the most severe problems is that while in this bowed state, the glass is no longer contacting the ceramic rolls except for the reduced area in the middle and is no longer receiving heating from conduction. This will lead to very non-uniform heating of the glass and will result in breakage, warpage, or exceedingly long heating times.

Accordingly, a need remains for an improved glass sheet heating furnace that overcomes the drawbacks in the prior art.

SUMMARY OF THE INVENTION

To address this drawback with purely radiative tempering systems, the present invention combines conventional radiation heat transfer with an alternate heating method suitable for low-E products using specialty surface treatment for the exterior glass. That is, forced convection air heating principles and related apparatus are applied in combination with radiation heat transfer in a novel fashion, unobvious to those trained in the art.

The general design of a glass tempering furnace constructed according to the present invention includes a chamber, rollers extending laterally within a chamber to form a transport surface for the plate glass, radiant coils positioned along the bottom of the chamber underneath the rollers, a plurality of spaced nozzle assemblies arranged in lateral side-by-side fashion within the chamber above the rollers, and fans coupled to the nozzle assemblies to draw heated air from the chamber and force the heated air onto the top surface of the plate glass. Heating elements, preferably electrically heated rods, extend between each of the nozzle assemblies and are positioned within the return path of the heated air after it is flowed onto the plate glass surface. The air then rebounds from the glass plate and flows over these heating elements PRIOR to the air again being drawn up into the fan and blown back down onto the glass. Air is then again drawn from the furnace chamber and forced through ducting to the nozzle assemblies.

The nozzle assembly contemplated for use with the invention includes a chamber into which the heated air is forced and a plurality of holes formed on a bottom plate thereof. The air is forced out these holes onto the plate glass and the return air rebounds from the glass and flows between the plurality of nozzle assemblies. The heated rods are positioned between these nozzle assemblies so that the air must flow past, and is thereby heated by, these rods. The heated rods additionally create radiative energy that impacts upon the top surface of the plate glass and heats it thereby. More specific configurations of the heating rods include stacked rods, where the bottom-most rod (the one closes to the plate glass) includes multizone heating control for greater control of the radiative heat that impacts the glass sheet surface.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 1 is a side elevation sectioned view showing the interior of the tempering furnace constructed according to a preferred embodiment of the invention.

FIG. 2A is an elevation front view taken along line 2A—2A in FIG. 1.

FIG. 2B is a top plan view of the furnace of FIG. 1.

FIG. 2C is a side elevation view of a portion of the furnace of FIG. 1 showing an upper heating zone of the invention.

FIGS. 3A–3C show orthogonal views of the air delivery ductwork of the furnace of FIG. 1.

FIGS. 4A–4C show orthogonal views of the nozzle plate and orifice pattern of the ductwork of FIGS. 3A–3C.

FIG. 6 is an elevation front view of an alternate embodiment of the invention.

DETAILED DESCRIPTION

Figure 5A:
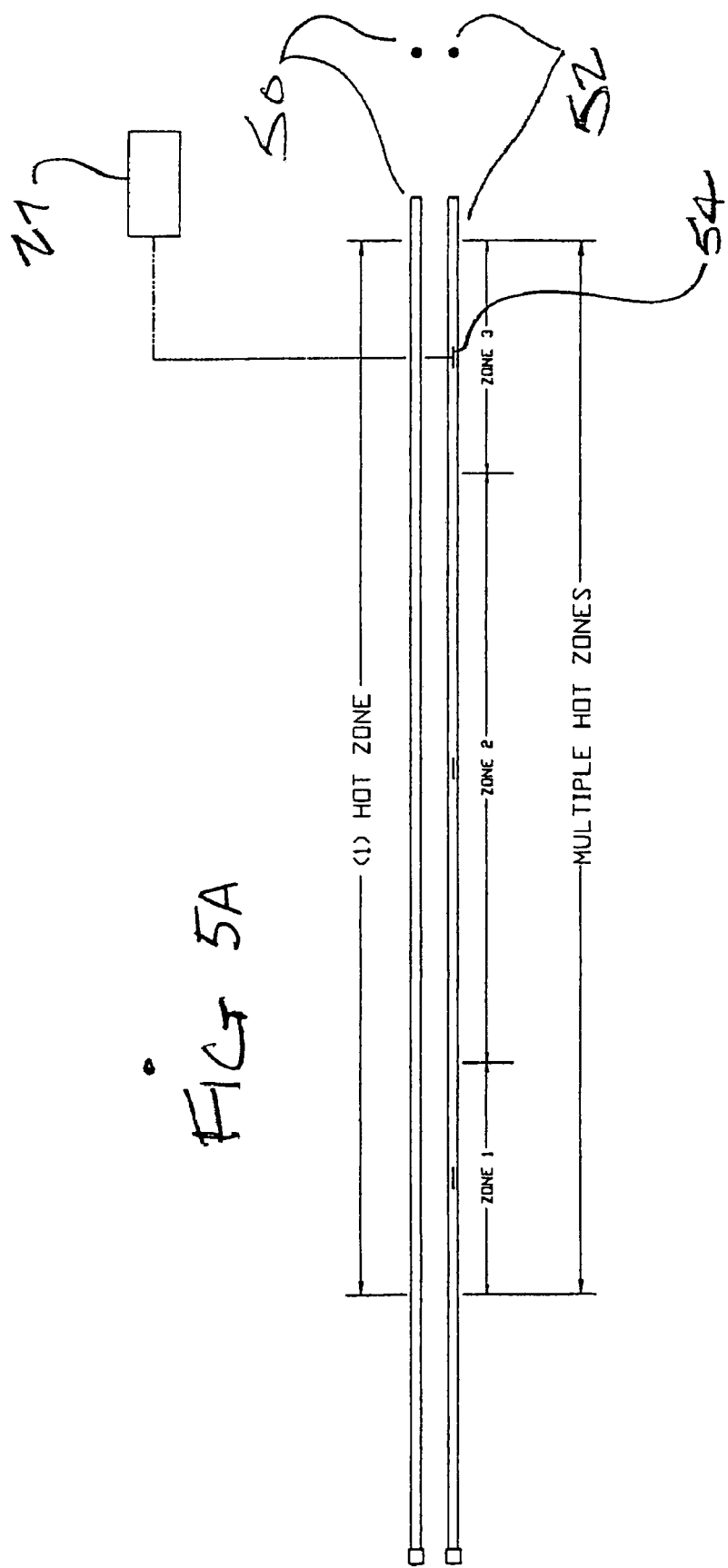
FIG. 5A illustrates a tubular sheath embodiment of the heating element used in the furnace of FIG. 1.

The forgoing disclosure assumes a general assembly as in FIG. 1 where the lower shell 22 is of known means to those trained in the art and industry. The lower shell 22 is constructed to incorporate all known radiation heating means, conveying system, structure, insulation, and exterior features of accepted design to those in the industry. The top shell 23, however, is a unique invention clearly differentiated by construction, support, operation, and process function from the lower shell 22. The top furnace shell 23 and bottom furnace shell 22 are to be considered as separate equipment entities. As such, this embodiment of the invention is directed primarily toward the novel features of the upper furnace 23.

The furnace constructed according to a preferred embodiment of the invention is shown generally in FIG. 1 at 10. Furnace 10 is constructed in top-bottom shell construction; the shells split along a horizontal datum generally defined as where the planar glass 20 surface might convey through the equipment.

The furnace is designed as a functional whole; however, it should be noted that the top and bottom shells might function in independent fashion. The bottom furnace shell 22 is supported and remains in a fixed height position from the floor datum 29 by structure of known means. The top furnace shell 23 is supported from a lift system constructed of integrated jackscrew assemblies 26 or similar apparatus rated for the top load requirements.

Conveying rolls 21 of known means support the glass during the process. In this embodiment, the conveying rolls 21 are cylinders of ceramic materials resistant to ambient high temperature and suitable for the process environment.

Fans 31 of high temperature construction are required for air recirculation within the furnace. The fans 31 are considered high flow, forward curved designs with integrated air-cooling. The fans 31 might be top-mounted as shown or of a sideboard layout. The convection layout and mechanicals required for internal furnace air recirculation (fans, ductwork, vanes, nozzles, impingement plates, etc.) are to be associated only with the top furnace shell 23.

It is noted that temperatures within the furnace are considered near the material limits of conventional materials and require care in selection. Ambient internal temperatures range from 670° C. to 700 ° C. (~1300° F.). Insulation 32 of thru-wall dimensions of 6"and greater are used to reduce energy consumption and other undesired environmental factors such as infiltration of plant air and leakage of furnace air to the plant. In this invention, the top furnace shell 23 utilizes a thermal break of insulation between offset structural members. This double-wall construction within the walls and roof minimizes the direct thermal conduction from inside to outside.

It is also be noted that the top shell 23 of this invention has internal surfaces 34 clad in heat resistant metal such as stainless steel (316SS or 309SS) to prevent insulation fibers from entraining in the recirculated atmosphere and contaminating the processing glass.

The invention assumes that the processing of low-E glass is such that the upper conveyed surface of the glass 20 is a surface of low-emissivity properties more suitable for convection heating. The bottom conveyed glass surface is typical of high-emissivity annealed glass 20 suitable for conventional radiation furnace designs.

Nozzle Design

The furnace design requires forced convection principles highly dependent on the end-of-the-run air delivery ductwork and the size, velocity, and uniformity of the impingement jets to the glass surface. The air delivery ductwork 40 repeats along the furnace length and remains supported above the processed glass sheet; connecting the air supply plenums 46R, 46L on right and left (FIG. 2A).

This invention utilizes ductwork 40 designed as a sheet metal enclosure (FIGS. 3A–3C); tapering from the ductwork openings toward the furnace center. The taper T is constructed to maintain a generally constant air velocity along the ductwork length as air flow exits the nozzle plate to the glass 20. The angular taper T from each end is equal; with a recommended taper of 20°(+/−5°) from the horizontal. The x-sectional opening dimensions of the ductwork 40 are calculated to allow for at least 3× the exit orifice area. The aspect ratio of the opening height H versus the opening width W is generally 5:1. The constant width dimension of the ductwork is generally equal to the spacing between ductwork assemblies.

Air entering the ductwork 40 from both the right and left supply plenums 46 exits along the ductwork length. Where the air supplied from each end might collide, a zone of high pressure exists. This results in higher velocity jets and faster heating, creating non-uniform results at this location. To avoid this scenario, the ductwork center is not coincident with the furnace center. Further, the furnace construction is such that the ductwork 40 is fixed in location at one plenum wall (e.g. 46R) and allowed to thermally expand through the plenum wall (e.g. 46L) on the opposite side. This fixed end of the ductwork 40 alternates along the length of the furnace resulting in the off-center location to be exaggerated toward the expanding ductwork 40 end.

As shown in FIG. 2C, the nozzle plate 42 is parallel and at a predetermined dimension from the glass surface. The nozzle plate 42 is a machined construction and of thermally stable and rigid materials such as 309SS, ¼" thick plate. As shown best in FIGS. 4A–4C, the described nozzle plate 42 seals the air ductwork and incorporates an array of orifice jets 43. The jet openings have been calculated in size, number, and distribution to have the optimum heating effect on the glass surface. In a preferred embodiment of the invention, the jets are drilled holes with a machined countersink inlet and 5/16" diameters selected to geometrically overlap when viewed along the furnace length. In general, the additive area of all the jets is no greater than approximately 7.5% of the plan area above the glass 20. This ratio is critical to allow the impingement jets to diverge between orifice diameters, blanket the entire glass surface, and exit via a generous exhaust area after impingement.

Heater Design

Specialized heaters 50,52 (FIG. 5A) maintain the recirculated air at extreme high temperatures. The heaters 50,52 also provide a radiant source where the processing of annealed glass is desired. To provide these functions, a 1-zone heater 50 and 3-zone heater 52 are configured as a grouping of the two heaters, located between each of the ductwork assemblies 40. The multiple zone heater 52 is retained in close proximity to the glass 20.

Figure 5B:
FIG. 5B illustrates an alternate heating element design from that shown in FIG. 5A.

The heaters are generally designed as tubular elements, with the geometry of a small diameter relative to their length. The heaters are externally sheathed in materials suitable for high temperature applications such as Inconel 600 or a similar material. The internal components include heating wire, such as nichrome, wound and configured to produce one or multiple zones of heating along the length. In another embodiment of the heater design (FIG. 5B), a ceramic core is wrapped externally with heating wire to produce equivalent heating zones.

It is anticipated that a 1-zone heater 50 would be used strictly for general ambient heating. The multiple zones of the 3-zone heater 52 are each instrumented with thermocouples 54 such that a process control system 27 might orchestrate which of these 3-zone heaters 52 and/or individual zones along the length might be controlled for optimal glass processing.

Open Layout Over Glass

A unique requirement of the invention is that the upper furnace shell 23 must be constructed with an open and non-obstructed working area over the glass. The convective transfer from the air delivery ductwork 40 and radiant transfer from the specialized heaters 50,52 requires that there not be any metalwork, supports, insulation or similar materials between these components and the glass 20. Introducing any structure between the glass 20 and ductwork 40 or heaters 50,52 will scatter or reflect the radiation transfer and impede the convective jets.

To minimize potential hot and cold spots, constant oscillation of the sheet glass in a forward-back motion within the furnace improves the uniformity of the finished product. Travel distances in each direction of 18" and greater are common in the industry. Motion of the glass from the side-to-side is precluded by the conveying system of rolls 21 where rotation is only along the length direction of the furnace. Though glass motion reduces inconsistencies within the sheet, localized imperfections and streaks in the length direction continue to result from blocking the energy source from the sheet. The glass may warp, or incur optical irregularities and uneven breakage properties relative to those areas open to the full energy transfer.

Open Layout-Mechanical Considerations

The reader should appreciate that the furnace sides and ends are structurally built to resist the weight load of both the exterior walls and roof, and all exterior mounted components of the upper shell 23. Similarly, the components on or within the working space of the upper shell 23 are constructed of heavy gauge sheet metals requiring substantial support and connection to the same external structure. Attention is called to the load bearing shelves 60 that seal the air supply plenums 46 (FIG. 6). These shelves extend along both length sides of the upper furnace 23 and extend into the furnace interior. The weight of the air ductwork 40 is transferred to the air supply plenum 46 walls and shelves 60 and allow the ductwork center and nozzle plate 42 to be essentially cantilevered over the glass sheet 20.

It should also be noted that the distance from orifice 43 to glass is critical. The dimension cited in forced convection applications is in the range of 4–12× the orifice diameter. In this invention, 3 " is conservatively selected to prevent the glass from potential warping and interfering with the overhanging structure. The dimension represents roughly 10× the 5/16" jet orifice diameters. To distribute the weight load of the ductwork 40 and maintain the predetermined distance from orifice to glass over the entire glass sheet; a unique rod-spring support system 70 has been constructed. FIG. 6 details a representation of the rod-spring system.

The shelf rods 72 connect to a pivot arrangement 74 at the interior shelf edges, and extend and terminate on the shell roof 25. The ductwork rods 73 connect to support piping 41 in-line with a slot in the center of the air ductwork 40, and similarly extend and terminate on the shell roof 25. Shelf rods 72 and ductwork rods 73 are spaced at even increments along the furnace and calculated to carry the load.

Note that any fixed length will thermally expand within the furnace. For example, the expansion length can be calculated as follows:

| | |
|---|---|
| Coeff. Of Expansion for Rod Materials of 316SS | $8.8 \times 10^{**} - 6$ in/(in-° F.) |
| Furnace Ambient | ~1250° F. |
| Room Ambient | ~70° F. |
| Temp Rise | 1180° F. |
| Expansion per Ft. | ~1/8"/Ft. |

If the rods are fixed at each end, the thermal expansion of a typical support rod member 4 ft. in length is ~1/2" (4 '×1/8"/ft.). Expansion will result in undue stress on the structure, rod stretch and/or cracking at the terminating rod at the ends More importantly ,it is possible that the air ductwork 40 will appreciably sag the discussed additional expansion length. (As calculated ~1/2").

To minimize the sag and reduce the potential of structural problems, a novel solution is forwarded. The rods ultimately terminate at topside attachment points along the exterior of the furnace roof 25. The system proposes that the expansion be absorbed by springs 76 at these locations, preloaded to support the primary weight of the internal components such as the air ductwork 40.

The rods 72, 73 penetrate the insulated furnace roof 25 and extend through a sealing base plate 77. The base is located above internal structure within the roof. The rods are assumed to be threaded at the far end. The rod end is attached to a top nut-plate 78. Turning the nut plate 78 causes the springs 76 to compress and pre-load, supporting the internal components. Further rotation and compression is equivalent to additional spring load carrying capacity.

At start-up, the upper furnace shell 23 is displaced at a known and fixed vertical dimension from the lower shell 22. Primary load support and vertical position of the external walls, roof, and mounted components of the upper shell 23 results from adjustment of the lift system 26. The internal components are supported from the roof 25 by adjustment of the nut-plate 78 until the shelves 60 are in nearly zero load carrying contact with standoffs 79 attached to the lower shell 22. Note that only a very minor load attributed to the shelf (and by connection, the air ductwork 40) is carried by said standoffs 79. The discussed rods and adjusted pre-load of springs carry the primary load of internal components.

As the furnace is heated to operating temperatures, the rods 72,73 thermally expand. Since the shelves 60 are constrained in the downward direction by mechanical interference with the standoffs 79, the rods must expand in an upward direction. This expansion is absorbed by the take-up in the springs 76.

The load carrying forces imparted on internal ductwork 40 and shelves 60 are obviously a function of the original pre-load. It is known that allowing the springs to expand will lose some of this pre-load. However, as calculated, the vertical expansion is generally in the range of ~½"; the original spring length ~4". The minor loss of pre-load is now taken by the standoff 79 supports.

Other furnaces and capital equipment structure require internal cross bracing, beams, and load-carrying columns. These structural allowances will appreciably interfere with the open layout desired for processing large glass sheet approaching dimensions of 100"×168". The techniques and concepts explored above are considered to be quite novel and unobvious to those experienced in the art.

Operation of Furnace

Convection

Fans 31 are arranged in groups of two; each fan supplying air within right or left zones (91R,L ... 96R,L) spaced equally along the longitudinal length of the furnace. The convection principles are best described by referring to the FIGS. 2A, 2B and 2C. The grouping is such that the air mass flow may be independently controlled on the right and left furnace sides. In other embodiments, a single fan might be used with mechanical means of dividing the airflow into right and left plenums. This division of air is advisable to provide a uniform air balancing system across the furnace width and required where the furnace may be loaded unequally from side-to-side with glass, or with glass of varying thickness, shape, or tempering qualities.

Fans suitable for extreme high temperature service are controlled from 0% to 100% of airflow by suggested electronic means 82 such as variable frequency drives. The supply air 84 is ducted from the fan scroll housings 31A to a transition plenum box 31B designed to spread the pulse of air along the zone length of the sidewall. These plenum boxes are so ducted as to transfer the air 84 with minimal pressure loss along a gradual internal radius from horizontal to vertical direction. The air is directed into the finger ductwork 40, entering through the finger openings 40A and pressurizing the finger cavities 40B.

The finger ductwork 40 and orifice plates 42 are so designed to uniformly transform the higher pressure low velocity air mass into individual jets of high velocity that impinge the glass. Velocities are suggested to be in the 1500 to 5000 FPM range for manufacturing economy of the air system and optimized heat transfer on the glass sheet.

The airjets 85 scrub the insulating boundary layer of air at the glass surface; introducing high temperature convection heat transfer. The spent gas is continually displaced with a continuum of air jets following behind in the circulation system.

The exhaust path of spent air is designed to flow in a specific manner between each of the finger ducts 40. The exhaust path is generally split, with ½ of the supply flow exiting to each respective side of the finger duct 40; and evenly along the finger length. The spent air follows the upward path of the exhaust stream 86 toward the fan inlets, recirculating in the described pattern.

Radiation

The heaters 50,52 shown in FIG. 2C are arranged in a specific functional orientation to the finger ductwork 40. The arrangement allows the spent exhaust air to travel over and around the heaters for efficient reheating of the air stream. Heaters function as a group of two, each group located between the finger ducts and each heater grouping repeating along the longitudinal furnace length. The effective hot length of the heater elements traverse the width of the furnace equal to the minimum width of glass that can be accommodated. The heaters are vertically arranged (See FIGS. 2C, 5A) in a manner such that the upper heaters 50 are typically of one zone and sized to generally re-heat the exhaust stream. The lower heaters 52 closest to the glass are split into multiple zones of unequal heating length and power. The heating zones, generally of right end-long center-left end construction may be turned off or on as manually desired or programmed by the control system 27.

The intent is that the lower heater 52 acts as a radiative system with the upper glass surface. It should be noted that the heaters are placed strategically in a specific manner between the finger ductwork 40 to improve the radiative transfer. The infrared emission is bounded such that sides of the finger ductwork 40 reflect the sideways heater infrared, providing a large spatial relationship with the glass.

In those applications processing high-emissivity glass, the radiation transfer from the lower heaters 52 plays an important role in general heating and tempering, such that the convection energy transfer might be reduced or unused. In those applications of low-E glass processing, the lower heaters act to balance or adjust the furnace processing from side to side and within the glass sheet center. By intermittently turning on or off all or any of the zones of the lower heaters 52, the glass might better achieve uniformity results in waviness, optical properties, and other parameters requiring fine-tuning of the processing cycles.

Production vs. Uniformity

Heating times are highly dependent on the physical properties of surface emissivity and sheet thickness. Good emitters are poor reflectors. Annealed glass, a good emitter, has an emissivity range of 0.85–0.95. Low-E glass, a very poor emitter, can exhibit values in the very low ranges from 0.15 to 0.04. In all cases, the thermal conductivity of glass is nearly equal. As such, convection can dominate radiation where low-E hardcoats and coatings reflects nearly all IR heating. The effects are more pronounced for thinner glass not moderated by conduction effects. Radiation is effective in applications where emissivities are high; including annealed glass and the untreated reverse side of low-E glass. Greater uniformity is also generally shown in radiation systems as the source heaters can be easily configured in a spatial relationship to the glass.

The industry state of the art incorporating convection is not highly developed. However, literature and early empirical results might be summarized:

| Process Times: (Heat-Up Time/Glass thickness): | |
| --- | --- |
| Convection | 30 Sec./mm |
| Radiation | 40 Sec./mm |
| Uniformity: | |
| Convection | *** Dependent on furnace design |
| Radiation | Generally greater than convection designs |

It should be apparent to the reader that the upper furnace shell incorporates infinite design flexibility in heating concepts. Convection is independently adjustable from 0 to 100% in both the right and left zones and along the furnace length. Radiation transfer is adjustable on or off from right side-center-left side at each heater grouping and along the furnace length.

The invention promotes a dominant convection purpose, radiation purpose, or radiation and convection furnace combinations to balance the glass processing requirements of uniform product qualities and production throughput.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A furnace having upper and lower zones within a furnace chamber incorporating different heating methods and adapted for tempering glass panels having a top surface with a lower emissivity than a bottom surface, the furnace comprising:
    rollers for carrying and supporting the glass panels as the panels traverse through the furnace chamber;
    the lower heating zone within the chamber including radiative heating elements disposed within the lower heating zone for heating the bottom surface of the glass panel, said radiative heating elements forming a primary source for heating the lower surface of the glass panel;
    the upper heating zone within the chamber including nozzle assemblies for forcing heated air onto the top surface of the glass panel and heating the top surface of the panel thereby, fan assemblies for circulating air drawn from the chamber to the nozzle assemblies, and radiative heating elements disposed in a return air path between the glass panel and the fan assemblies for heating the air as it is drawn from the chamber by the fan assemblies.

2. The furnace of claim 1, further including ductwork coupled between the fan assemblies and the nozzle assemblies, the ductwork positioned laterally within the furnace chamber and including left and right plenums through which air from the coupled fans are directed.

3. The furnace of claim 2, wherein the ductwork including a center that is offset from a center axis of the furnace chamber.

4. The furnace of claim 3, wherein the ductwork is affixed on one end to alternating left and right sides of the furnace chamber.

5. The furnace of claim 2, wherein the ductwork is tapered from the plenums toward the furnace center to maintain generally constant air velocity along the ductwork length as air exits the nozzle assembly.

6. The furnace of claim 5, wherein the ductwork is tapered from between about 15 and 25 degrees from horizontal.

7. The furnace of claim 2, wherein the ductwork includes a cross-sectional opening that is at least three-times an exit orifice area through the nozzle assemblies.

8. The furnace of claim 2, wherein the ductwork includes an opening height to opening width ratio of about 5:1.

9. The furnace of claim 2, wherein the ductwork is spaced along the length of the furnace chamber by a dimension that is approximately equal to a width of the ductwork.

10. The furnace of claim 1, wherein the nozzle assemblies include a nozzle plate incorporating a two-dimensional array of orifice jets.

11. The furnace of claim 10, wherein the two-dimensional array of orifice jets includes at least two rows of orifice jets that are offset with respect to one another.

12. The furnace of claim 10, wherein an additive area of all orifice jets is no greater than approximately 7.5% of a plan area above the glass panels.

13. The furnace of claim 10, said nozzle plate being spaced above from the top surface of the glass plate between approximately 4 to 12 times a diameter of the orifice jets.

14. The furnace of claim 1, wherein the radiative heating elements are mounted laterally between the nozzle assemblies.

15. The furnace of claim 14 further including a pair of radiative heating elements disposed between each nozzle assembly in stacked relation to the glass panel so that return air that has impinged upon the top surface of the glass panel flows proximate and is heating thereby a first of the pair of heating elements before flowing proximate a second of the pair.

16. The furnace of claim 15, said first of the pair of heating elements includes multiple heating zones disposed along a length of the first heating element.

17. A glass tempering furnace comprising a lower shell and an upper shell forming a heating chamber therebetween, said lower shell resting on a floor surface and said upper shell constrained from expansion in a downward direction and suspended above said lower shell by a pre-loaded rod-spring support system, said rod-spring support system including:
    a shelf rod attached at a proximal end to a lower portion of the upper shell and a distal end passing up through a roof of the upper shell; and
    a spring preloaded between the roof of the upper shell and the distal end of the shelf rod whereby expansion of the shelf rod due to heating within the furnace is accommodated by extension of the pre-loaded spring at the distal end.

18. The glass tempering furnace of claim 17, wherein the rod-spring support system further includes a sealing base plate in contact with the roof of the upper shell and through which the shelf rod passes, and a top nut plate accommodating the distal end of the shelf rod wherein turning the nut plate causes the spring to compress and pre-load.

19. A glass tempering furnace comprising:
    a chamber;
    rollers extending laterally within the chamber to form a transport surface for the plate glass;
    radiant coils positioned along the bottom of the chamber underneath the rollers;
    a plurality of spaced nozzle assemblies arranged in lateral side-by-side fashion within the chamber above the rollers;

fans coupled to the nozzle assemblies to draw heated air from the chamber and force the heated air onto a top surface of the plate glass; and heating elements extending between each of the nozzle assemblies and positioned within a return path of the heated air after it is flowed onto the plate glass surface so that the air then rebounds from the glass plate prior to the air again being drawn up into the fan and blown back down onto the glass.

20. The glass tempering furnace of claim 19, wherein the heating elements are electrically heated rods.

21. The glass tempering furnace of claim 19, wherein the heating elements comprise an upper heating element and a lower heating element oriented vertically with respect to one another, said upper heating element sized to generally re-heat air within the return path and said lower heating element having multiple zones of unequal heating length and power for radiative heating of the plate glass.

* * * * *